United States Patent [19]

Clarke

[11] Patent Number: 5,090,647
[45] Date of Patent: Feb. 25, 1992

[54] HOSE TROLLEY

[76] Inventor: Samuel T. Clarke, 8-2 Louisburg Sq., Nashua, N.H. 03060

[21] Appl. No.: 657,428

[22] Filed: Feb. 19, 1991

[51] Int. Cl.⁵ .............................................. B05B 15/00
[52] U.S. Cl. ...................................... 248/87; 248/81; 242/86
[58] Field of Search .................. 248/87, 75-77, 248/80, 81, 89, 156; 242/86

[56] References Cited

U.S. PATENT DOCUMENTS

| | | | |
|---|---|---|---|
| 1,468,776 | 9/1923 | Doll | 242/86 |
| 1,675,140 | 6/1928 | Schenderlein | 242/86 X |
| 1,914,654 | 6/1933 | Tornblom | 242/86 X |
| 1,940,701 | 12/1933 | Shope | 248/89 X |
| 2,865,673 | 12/1958 | Hathaway | 248/88 X |
| 4,246,675 | 1/1981 | Costanzo | 242/86 X |
| 4,305,553 | 12/1981 | Coquerel | 242/86 |
| 4,586,676 | 5/1986 | Johnston et al. | 242/86 |

FOREIGN PATENT DOCUMENTS 249376  9/1987  U.S.S.R. ............................... 242/86

*Primary Examiner*—Alvin C. Chin-Shue
*Attorney, Agent, or Firm*—Cesari and McKenna

[57] ABSTRACT

A supporting device to elevate and facilitate pulling a garden hose is disclosed. The device is composed of a support and a hose holder which is affixed to the top of the support. The hose holder includes a channel defined by one or more rotary members, such as rollers or pulleys. The channel is dimensioned to relatively snugly receive a hose. When a hose is dragged through the channel, it leans against one or more of the rotary members and causes the latter to turn. As a result, the hose can be pulled along by the user easily.

12 Claims, 2 Drawing Sheets

HOSE TROLLEY

FIELD OF THE INVENTION

This invention relates generally to a device to elevate and facilitate pulling a hose, and particularly to a support which enables one to move a hose around when watering a garden without dragging the hose across the garden bed and causing damage thereto.

BACKGROUND OF THE INVENTION

According to a recent study, garden and lawn care has become one of the most popular leisure time activities in the United States. The study indicates that individuals in more than four fifths of all American households work on their lawns or gardens.

All plants need water for their subsistence and growth. Thus, a flower or vegetable garden periodically requires watering, especially during the summer season. This usually calls for the gardener to connect a garden hose to a faucet and drag it across the garden to be watered. The hose, when dragged across the garden bed, may cause damage to the flowers or vegetables grown therein. Even if the flowers or vegetables in the garden are not damaged, mulch or other ground cover which has been placed around them for one purpose or another can be disturbed by the hose.

There is a need, therefore, to solve the above-mentioned problems which are usually associated with manual watering of a garden using a hose.

SUMMARY OF THE INVENTION

Accordingly, it is a general object of the present invention to provide a device for supporting a hose used to water a garden so that the hose does not cause any damage to the garden.

It is another object of the present invention to provide a device of this type which enables the user to pull the hose easily.

It is still another object of the present invention to provide a device of this type which enables the user to water a garden from all directions while the device is affixed to the ground.

A further object of the invention is to provide a device of this type which can be affixed to the ground easily.

Yet another object of the invention is to provide a device of this type which is light-weight and can be carried about conveniently.

Still another object of the present invention is to provide a device of this type which is relatively simple and inexpensive to make.

Other objects will, in part, be obvious and will, in part, appear below.

The invention accordingly comprises the features of construction, combination of elements and arrangement of parts which will be exemplified in the following detailed description, and the scope of the invention will be indicated in the claims.

Briefly and generally, the present invention comprises a means for holding a garden hose and a support means for supporting the hose holding means at an elevated position above the ground. The height of the support means is preferably adjustable. The hose holding means, on the other hand, holds the hose and facilitates its pulling to a desired area in the garden to be watered.

More specifically, the hose holding means includes a channel so dimensioned as to relatively snugly receive a garden hose. The channel is defined by at least one rotary member. When a hose is dragged through the channel, it tends to lean against the rotary member and cause the latter to turn. As a result, the hose can be pulled along by the user without much difficulty.

In one embodiment of the present invention, the hose holding means is mounted onto the support means via a swivel joint and the channel in the holding means is defined by four ball-shaped axial rollers. This construction permits the holding means to rotate freely with respect to the support means so that a hose can be pulled in any direction through the channel.

In another embodiment of the present invention, the channel is defined by the grooves of two juxtaposed pulleys. The hose can be pulled easily through the channel as its movement causes the pulleys to turn.

Preferably, the support means is a post with a pointed lower end so that the post can be pushed into the ground easily. It is also desirable that the post be composed of two tubular sections with one section being able to telescope into the other. This enables the user to adjust the height of the pole within a broad range.

BRIEF DESCRIPTION OF THE DRAWING

The above and further features and advantages of the invention may be better understood by referring to the following detailed description takes in conjunction with the accompanying drawing, in which.

As used herein, the terms such as "upper", "lower", "top", "bottom" and the like are intended only to denote relative direction solely with reference to the accompanying drawing.

DETAILED DESCRIPTION OF ILLUSTRATIVE EMBODIMENTS

Figure 1:
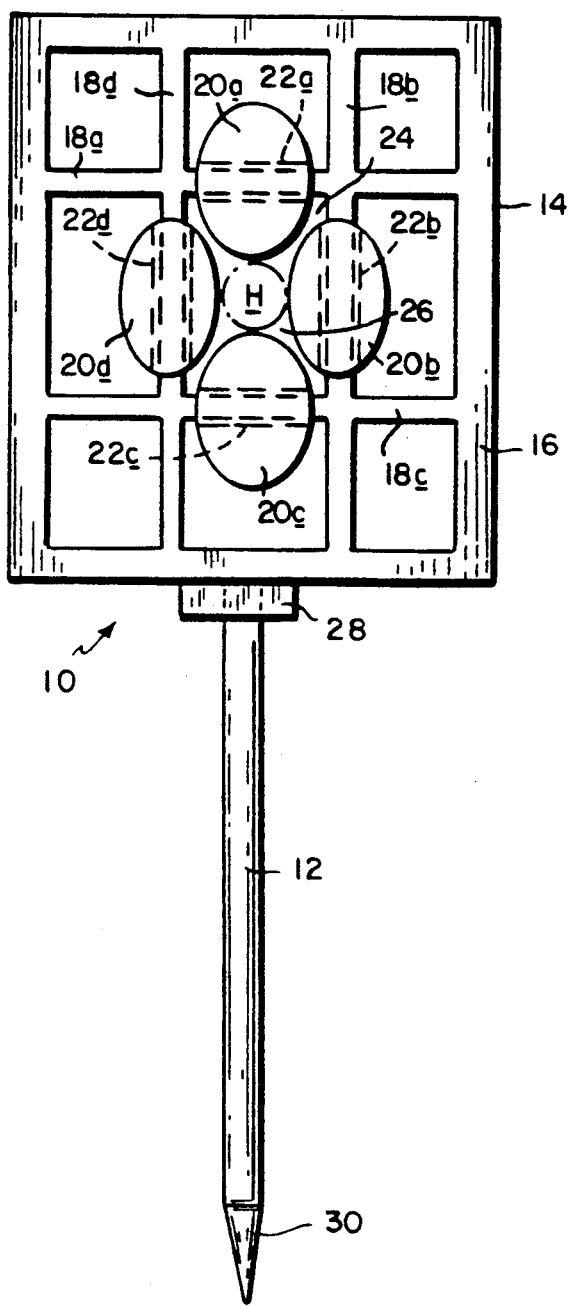
FIG. 1 is a front view of a supporting device to elevate and facilitate pulling a hose.
Figure 2:
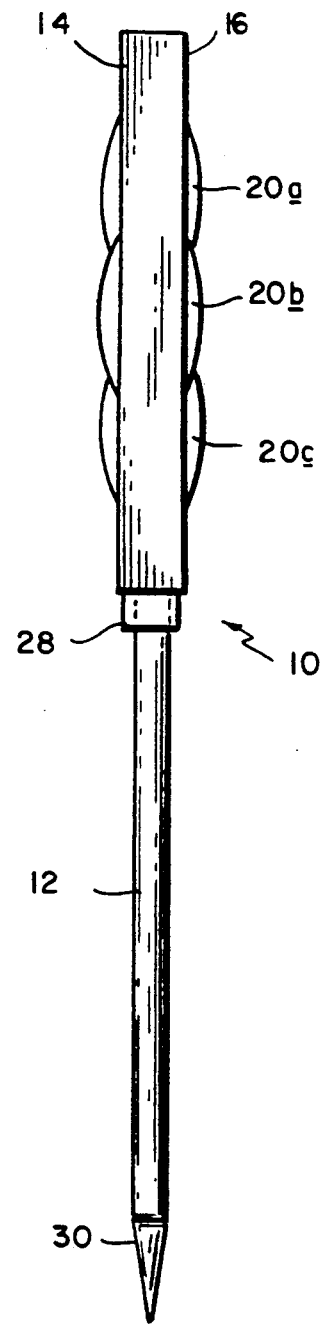
FIG. 2 is a side view of the device of FIG. 1.

Refer first to FIGS. 1 and 2 of the drawing which illustrate a supporting device to both elevate and facilitate pulling a garden hose, the device being constructed in accordance with a preferred embodiment of the present invention. The supporting device, which is designated generally by the numeral 10, is composed of two basic components, namely, a support post 12 and a hose holding body 14.

As best seen in FIG. 1, the hose holding body 14 includes a rectangular frame 16, four shafts 18a, 18b, 18c and 18d arranged as a grid in frame 16, and four oval rollers 20a, 20b, 20c and 20d mounted to the shafts. Two passages 22a and 22c extend along the short axes of rollers 20a and 20c, respectively. Two passages 22b and 22d, on the other hand, extend along the long axes of rollers 20b and 20d. All passages 22a, 22b, 22c and 22d are so dimensioned as to accommodate shafts 18a, 18b, 18c and 18d.

The shafts 18a, 18b, 18c and 18d are connected to the frame 16 in such a manner as to form a rectangular opening 24 in the center of the frame 16. In the center of the opening 24, a channel 26 is formed. The channel 26 is defined by four rollers 20a, 20b, 20c and 20d which are rotatably mounted to shafts 18a, 18b, 18c and 18d via their respective passages 22a, 22b, 22c and 22d. The rollers 20a, 20b, 20c and 20d are dimensioned so that not only are they capable of rotating freely around the shafts 18a, 18b, 18c and 18d, respectively, without interfering with each other, but the channel 26 defined by them can somewhat snugly receive a garden hose, as shown in phantom at H in FIG. 1. Note that the rollers 20a, 20b, 20c and 20d shown in the FIG. 1 embodiment 10 are centered on their respective shafts by mutual support. However, other suitable means may also be used to ensure that the rollers 20a, 20b, 20c and 20d remain in their proper places at all times.

While the hose holding body 14 can be connected securely to the top of the support post 12 by any suitable means, it is preferred that these two components be assembled via a swivel joint 28 so that the hose holding body 14 can turn freely with respect to the support post 12.

Preferably, a spike 30 is provided at the bottom of the support post 12 to facilitate fixation of the device 10 to the ground. Also, it is desirable that the support post 12 be able to snap into the swivel joint 28. With this feature, the device 10 may be advantageously packed and sold as a kit which includes one hose holding body 14 with an integral swivel joint 28 and a plurality of support posts 14 of various heights. This enables the user, before use, to choose the support post 12 of a desired height and conveniently snap it into the swivel joint 28.

While the hose supporting device 10 may be made of any suitable material, high-impact plastics, e.g., polystyrene, polycarbonate or polyvinylchloride, are preferred because they are light-weight and their manufacturing costs are relatively low. When plastic materials are used to make the support, a number of fabrication processes, such as injection molding, hot stamping or vacuum forming, may be adopted. The decision should be based on factors such as desired durability, strength, rigidity and cost of the product.

In use, the supporting device 10 is first positioned, by pushing the spike 30 into the ground, at a suitable spot near or in the garden to be watered. The hose is then threaded through the channel 26. When the hose is pulled in a particular direction by the user, the hose leans against and rotates one or more of rollers 20a, 20b, 20c and 20d. Such rotation enables the user to pull the hose through the channel 26 without much difficulty even when he or she is at some distance from the device 10. The smooth curvature of the rollers 20a, 20b, 20c and 20d makes it relatively easy for the user to move the hose both laterally or vertically if necessary.

Figure 3:
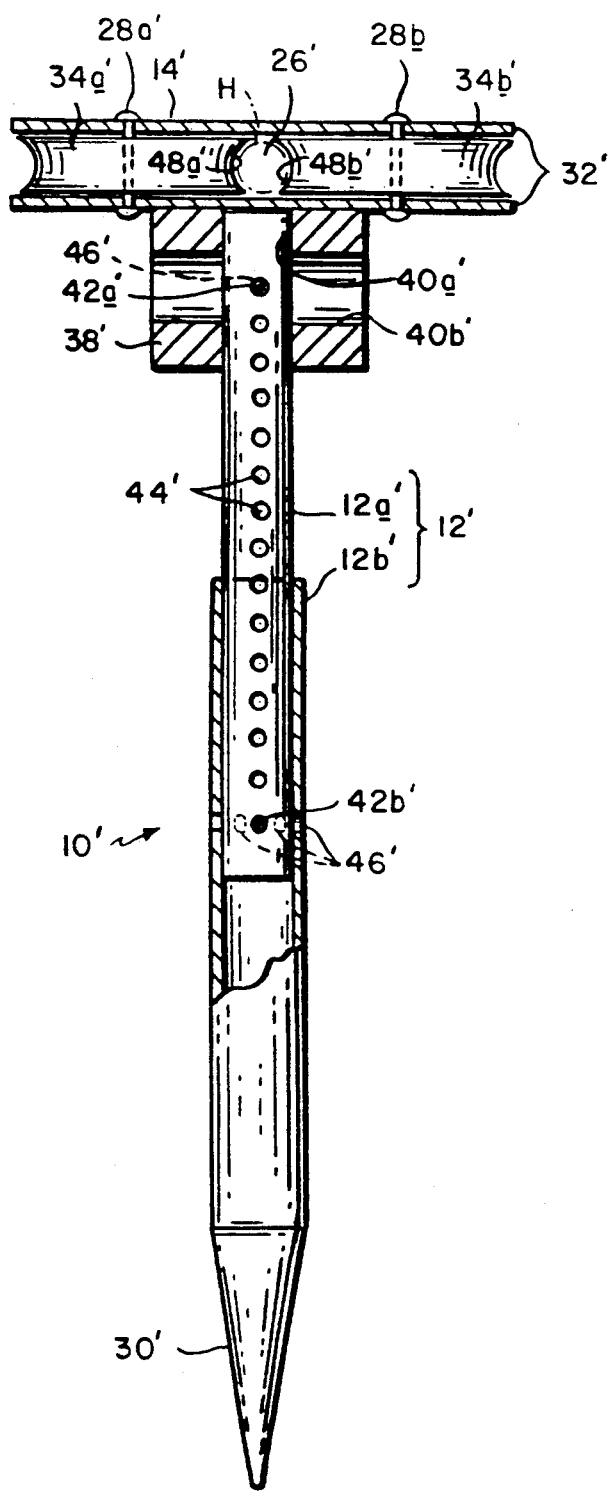
FIG. 3 is a front view in medial section showing another hose support embodiment with its components assembled in one manner.
Figure 4:
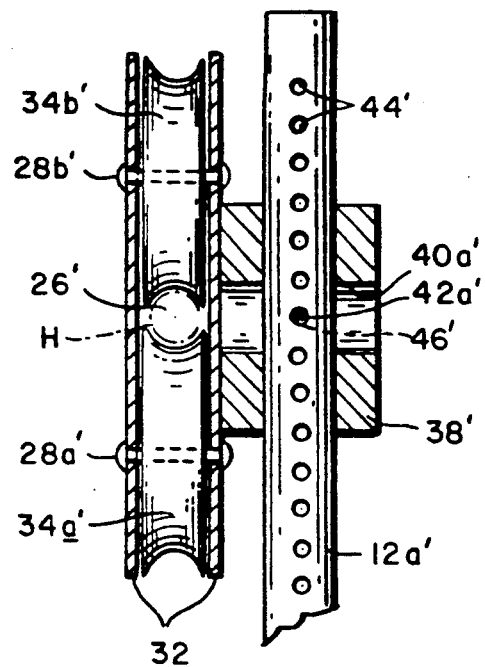
FIG. 4 is a similar view showing in part the hose support of FIG. 3 with its components assembled in another manner.

Refer now to FIGS. 3 and 4 which depict a somewhat different hose supporting device 10' incorporating the present invention. Device 10' is similar in several respects to embodiment 10 shown in FIGS. 1 and 2. For example, it includes a support post 12' and a hose holding body 14'. Further, the support post 12' has a pointed bottom spike 30'. Also, a channel 26' is formed in the central region of the hose holding body 14' to receive a garden hose H.

However, as clearly shown in FIG. 3, the hose holding body 14' in device 10' is composed of two pulleys 34' and 34b', rotatably connected side-by-side to a frame 32' via shafts 28a' and 28b', respectively. The grooves 48a' and 48b' of the pulleys 34a' and 34b' face each other to define the channel 26'. The frame 32' is mounted to a connector 38' which serves to join the support post 12' and the hose holding body 14'. The connector 38' contains two perpendicularly intersecting passages 40a' and 40b' which are dimensioned to be capable of receiving the upper portion of the support post 12'.

FIGS. 3 and 4 demonstrate, respectively, the two ways in which the hose holding body 14' may be mounted to the support post 12'. More specifically, FIG. 3 shows reception of the upper portion of the support post 12' in passage 40a' and FIG. 4 in passage 40b'. The user can choose to assemble the support post 12' and the hose holding body 14' in either manner, depending on his or her needs. For example, the passage 40a' will be used if the hose H is to be moved laterally and the passage 40b' is preferred for vertical movement of the hose H.

For either assembly, the support post 12' is affixed to the connector 38' by means of a locking pin 42a' which extends through registering holes 44' and 46' in the support post 12' and connector 38' respectively. As will be discussed in greater detail below, a plurality of registering holes 44' are provided along the support post 12'.

Preferably, the support post 12' is composed of two tubular sections, i.e., upper section 12a' and lower section 12b', which are dimensioned to enable the latter to telescope into the former. As shown in FIG. 3, a plurality of pairs of registering holes 44' are provided along the upper section 12'. Note that FIGS. 3 and 4 only show the holes 44' vertically arranged on one side of the tubular upper section 12a'. In contrast, a horizontal set of holes 46', say twelve, are provided around the lower section 12' in such a way as to form six pairs of registering holes 46'.

The two sections 12a' and 12b' are held together by extending another locking pin 42b' through a pair of registering holes 44' in the upper section 12a' and a pair of registering holes 46' in the lower section 12b' in a manner similar to that used in mounting the connector 38' onto the support post 12'. Such construction enables the user to adjust the height of the support post 12' within a broad range. Further, it permits the user to turn the upper section 12a', and thus the hose holding body 14' joined thereto, with respect to the lower section 12'b which is staked in the ground.

The foregoing description has been limited to a specific embodiment of this invention. It will be apparent, however, that variations and modifications may be made to the invention, with the attainment of some or all of the advantages of the invention.

For example, while it is preferred that the hose channel 26, 26' be defined only by a plurality of rotary members such as rollers or pulleys, a channel defined by both rotary and rigid members is nonetheless functional, although less effective, in terms of facilitating the pulling of a hose through the channel.

Further, although axial rollers are used in device 10, it is obvious to one of ordinary skill in the art to use other types of rollers, such as ball rollers, if he or she so desires. Similarly, the shape of rollers is more or less a matter of design choice, even though it is preferred that their curvatures be rather smooth.

In addition, the hose holding body 14, 14' may be placed upon a wheeled portable platform instead of on a post described above. Moreover, in the platform version, one could use a pneumatic or hydraulic lift assembly to raise and lower the hose holding body.

Therefore, it is the object of the appended claims to cover all such variations and modifications as come within the true spirit and scope of the invention.

What is claimed is:

1. A transportable supporting device to elevate and facilitate pulling a hose relative to a ground surface, which device comprises:

support means;

hose holding means for supporting a section of the hose which has been extended out along the ground surface so that the section of the hose is elevated and substantially parallel to the ground surface;

said support means including a post having a top connected to said hose holding means, a bottom which can be removably positioned on the ground surface, and a height such that said hose holding means is supported at an elevated position above the ground surface; and said hose holding means including a frame member and at least a pair of opposed rotary members defining a channel therebetween to receive the hose and having an axis of rotation oriented so that said rotary members rotate upon pulling of the hose through the channel and thereby facilitating the pulling.

2. The device recited in claim 1 in which the top of said post is connected to the frame member of said hose holding means by a swivel joint so that said hose holding means can swivel relative to said post.

3. The device recited in claim 1 wherein said rotary members comprise rollers.

4. The device recited in claim 3 wherein said hose holding means includes two pairs of opposed rollers, a first pair of said rollers having their axes of rotation substantially parallel to said post, and a second pair of said rollers having their axes of rotation substantially perpendicular to said post, said rollers together defining the channel through which the hose is pulled.

5. The device recited in claim 4 wherein said rollers have an oval shape.

6. The device recited in claim 1 wherein the bottom of said post is pointed so that it can be removably inserted into the ground surface.

7. The device recited in claim 1 wherein said support means and said hose holding means are made of plastic material.

8. The device recited in claim 1, wherein said rotary members include two pulleys juxtaposed with their rotary axes in parallel and having grooves facing each other.

9. The device recited in claim 8, wherein said support means has a longitudinal axis and is connected to said hose holding means so that said longitudinal axis is perpendicular to said rotary axis.

10. The device recited in claim 8, wherein said support means has a longitudinal axis and is connected to said hose holding means so that the longitudinal axis is parallel to said rotary axies.

11. The device recited in claim 1, wherein said post includes two sections with one section being able to telescope into the other.

12. The device recited in claim 1, wherein the height of said support means is adjustable.

* * * * *